(12) United States Patent
Van Hattem et al.

(10) Patent No.: US 7,581,489 B2
(45) Date of Patent: Sep. 1, 2009

(54) BEVERAGE BREWING DEVICE

(75) Inventors: Jan Cornelis Van Hattem, Amerongen (NL); Robert Francis De Reus, Zavenaar (NL)

(73) Assignee: Wittenborg ApS, Odense C (DK)

( * ) Notice: Subject to any disclaimer, the term of this patent is extended or adjusted under 35 U.S.C. 154(b) by 625 days.

(21) Appl. No.: 10/553,212

(22) PCT Filed: Apr. 16, 2004

(86) PCT No.: PCT/EP2004/050556

§ 371 (c)(1),
(2), (4) Date: Oct. 13, 2005

(87) PCT Pub. No.: WO2004/093619

PCT Pub. Date: Nov. 4, 2004

(65) Prior Publication Data

US 2007/0034083 A1  Feb. 15, 2007

(30) Foreign Application Priority Data

Apr. 23, 2003  (IT)  ............................ PN2003A0028

(51) Int. Cl.
*A47J 31/32* (2006.01)

(52) U.S. Cl. .................. 99/302 R; 99/289 R

(58) Field of Classification Search ............... 99/302 R, 99/289 R, 303
See application file for complete search history.

(56) References Cited

U.S. PATENT DOCUMENTS

| 3,440,952 | A | | 4/1969 | Merola et al. |
| 3,478,670 | A | | 11/1969 | Fuqua |
| 3,478,673 | A | * | 11/1969 | Burney ...................... 99/302 R |
| 3,478,675 | A | * | 11/1969 | Wright ...................... 99/302 R |
| 5,937,738 | A | * | 8/1999 | Okamura et al. ........... 99/302 R |
| 5,992,300 | A | * | 11/1999 | Fukushima ................ 99/302 R |

* cited by examiner

*Primary Examiner*—Reginald L Alexander
(74) *Attorney, Agent, or Firm*—Wenderoth, Lind & Ponack, L.L.P.

(57) ABSTRACT

A beverage brewing device for brewing hot beverages such as coffee, tea, roasted-barley coffee, camomile tea and similar infusions. The brewing device includes a brewing chamber in which the substances needed to prepare the infusion are introduced through a mixing hopper, which is situated above the brewing chamber, and are mixed by compressed air being admitted thereinto. The device further includes a removable filter that closes the brewing chamber on the lower side thereof. The opening connecting the mixing hopper) with the brewing chamber is closed by an automatic valve, which is actuated by the compressed air supplied via a delivery conduit.

7 Claims, 1 Drawing Sheet

BEVERAGE BREWING DEVICE

BACKGROUND OF THE INVENTION

The present invention refers to a brewing device for the preparation of beverages, in particular hot beverages such as coffee, tea, roasted-barley coffee, camomile tea and similar brews and infusions, which makes use of compressed air for filtering and mixing the substances that make up the beverage.

Brewing devices of the above-indicated kind are largely known in the art and substantially comprise a vertical cylindrical body, in which the substances in powder form and the water are introduced through a filling hopper, arranged above the cylinder, and are mixed-filtered by air being admitted under pressure thereinto. These devices enable beverages to be obtained, which are thoroughly homogenized and may be more or less flavoured or tasty, and possibly more or less frothy, according to the actual requirements of the buyers.

A brewing device of this kind is for example described in the Japanese patent publication JP-A-01-158592. The device disclosed in this Japanese patent provides for the possibility for compressed air to be let into the brewing cylinder through two different conduits, which debouch into the lower-side portion and the upper-side portion of the cylinder, respectively. The two conduits are selectively opened by means of a three-way flow-diverting valve installed in the conduit that connects the air pump with the brewing cylinder.

The opening that establishes a communication between the filling hopper and the brewing cylinder is closable by a valve performing a reciprocating motion as driven by a specially provided motor. The solution described in this Japanese patent turns however out as being rather complicated from a structural point of view, as well as scarcely reliable from an functional point of view; it in fact calls for a number of different operating parts to be used, which imply quite high costs due to both the components and the assembly thereof.

SUMMARY OF THE INVENTION

U.S. Pat. No. 3,478,670 discloses another coffee brewer provided with a movable brew cylinder and a plurality of separate air circuits with respective valves. Such a solution suffers the same drawbacks of the already cited Japanese patent.

It therefore is a main object of the present invention to provide a device for brewing beverages, which is particularly simple and rational in the operation and construction thereof owing to various functions being combined and integrated in view of reducing minimizing the number of moving parts of the device to a minimum, i.e. minimizing the number of those components which require being moved.

Within this general object, it is a purpose of the present invention to provide a beverage brewing device, which is capable of ensuring that the brewing chamber is duly flushed and washed during each operating cycle of the device.

Another purpose yet of the present invention is to provide a brewing device, whose component parts are provided so as to be easily and conveniently disassembled and removed to maintenance and cleaning purposes.

According to the present invention, these aims are reached in a brewing device incorporating the characteristics as recited in the appended claims.

Features and advantages of the present invention will anyway be more readily understood from the description that is given below by way of non-limiting example with reference to the accompanying drawing showing a schematical, partially cross-sectional view of the brewing device according to the present invention.

DETAILED DESCRIPTION OF THE INVENTION

Figure 1:
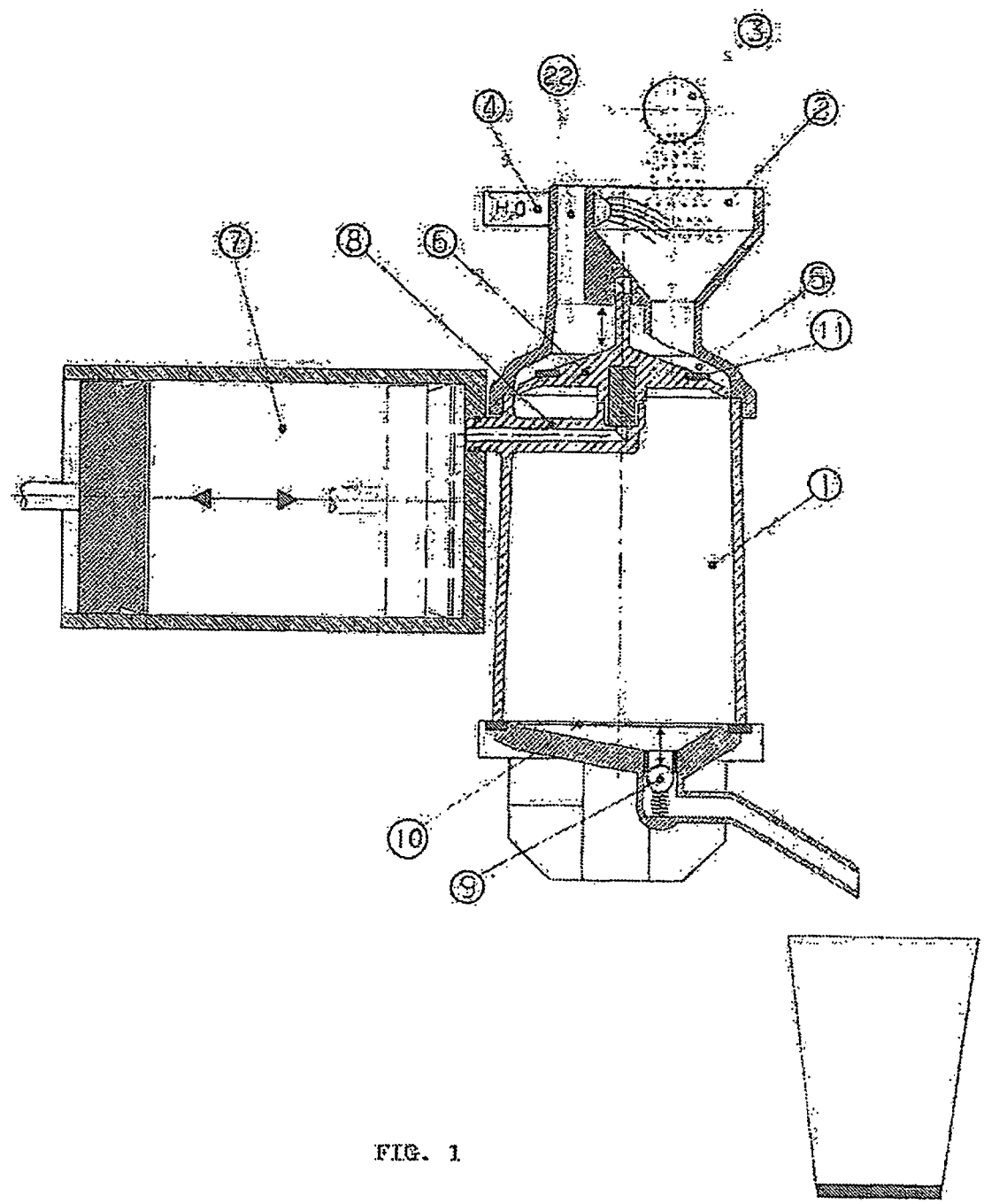
FIG. 1 illustrates a brewing device in accordance with an embodiment of the present invention.

In the drawing, the brewing device is shown to substantially comprise a brewing chamber 1, in which the substances needed to prepare the infusion, i.e. the beverage are introduced through a filling and mixing hopper 2 that is situated above said brewing chamber. This hopper 2 is in turn supplied via a feeding mouth 3 that is connected with at least a reservoir (not shown), in which there is contained a substance, such as for instance ground coffee, which must be brewed.

The device itself can of course be provided with various reservoirs, each one of which contains a different substance for brewing. Preferably, all of these various reservoirs are directed with their delivery mouths towards the hopper 2. Furthermore, into the same hopper 2 there is conveyed, via a conduit 4, the hot water required to brew the selected substance.

To the hopper 2 there is separately associated a conduit 22 for venting air outside the device; this enables froth to be prevented from forming as the substances are mixed up in the same hopper.

The brewing chamber 1 and the hopper 2 are connected with each other via an opening 5.

According to the present invention, the opening 5 is closed by an automatic valve 6 that is actuated by means of a jet of compressed air. This valve 6 is arranged with its axis extending vertically and is so shaped as to be able to be guided in such a manner as to displace reciprocatingly through the opening 5.

In a particular embodiment thereof, the valve 6 is in an umbrella-like shape and is provided on the upper surface thereof with a ring-shaped seal 11 adapted to close the opening 5 in a tight manner. The means provided to guide and retain the valve 6 in the opening 5 may be of any suitable type or kind known as such in the art; in the accompanying drawing, these means are simply represented by members shown to be coupled to each other in a loosely sliding manner.

The actuation of the valve 6 is brought about by means of a jet of compressed air, which is generated by an appropriate source 7, and which is delivered directly against the valve body. The compressed-air source 7 may be provided for example in the form of an axial reciprocating-piston compressor that is directly associated to the brewing chamber 1 (as shown in the FIGURE). Otherwise, use can be made here of a rotary compressor, which may be situated even far from the brewing chamber. In any case, the compressed air generated by the compressor 7 is delivered via a conduit 8 debouching below the valve 6, in such a manner as to cause it to act against the umbrella-shaped body of the same valve.

It will be readily appreciated that the shape of the valve 6 may be variously modified, provided that it keeps ensuring an automatic, tight closure of the opening 5 under the action of the compressed air.

In order to enable the liquid mixture that is produced in the hopper 2 to flow out of the same hopper, the valve 6 is actuated into opening by the action of the negative pressure created within the brewing chamber 1 when the piston moves backwards after compression or, in the case of a different air-operated system, when it changes from compression mode into suction mode, exerting a corresponding action through the conduit 8.

Finally, the brewing device comprises a control valve 9, preferably of a ball type with retaining spring, or any other suitable type known as such in the art, for preventing the liquid from flowing or leaking out of the brewing chamber prior to the compressed air being able to start exerting its action, as well as for enabling a negative pressure to build up during the return stroke of the piston or the suction phase of any other system that may be used. The valve 9 is associated to a filter 10, through which the brew is delivered and in which, upon the brew being in this way delivered therethrough, the retained residue is collected for removal.

The valve 9 is opened automatically by the pressure created by the piston in the brewing chamber, whereas it is closed by the action of the spring.

The brewing device according to the present invention works in the following manner.

To start with, the substances required for brewing (e.g. ground coffee and hot water) are delivered in an appropriately metered amount into the mixing hopper 2. The air compressor 7 is not operating; the valve 6 is open, whereas the valve 9 is closed. The metered water delivery is stopped with a certain delay in view of enabling the hopper 2 and the valve 6 to be flushed clean therewith. The mixture formed in the hopper flows down into the brewing chamber 1, where it dwells for a few seconds, i.e. the time required for the brewing to be completed.

Thereupon, the air compressor 7 is operated to generate a jet of compressed air that causes the valve 6 to close. The pressure within the brewing chamber 1 builds up, thereby causing the valve 9 to open and enabling in this way the brew to flow out by passing through the delivery filter.

While the air compressor 7 is holding the brewing chamber 1 under pressure and, therefore, the beverage is being dispensed, a small amount of water is let into the hopper 2, so that, when the air compressor changes from the compression mode into the suction mode, the valve 9 is biased into closing by its own spring, whereas the valve 6 opens owing to the action of the negative pressure created in the meanwhile. At this point, the hot water contained in the hopper 2 flows down through the valve 6 which produces a kind of "umbrella" effect to urge the down-flowing water against the walls of the brewing chamber, thereby cleaning them from the brewing residues.

Then, the air compressor 7 is again operated to close the valve 6. In this manner, the valve 9 opens again and all residues are eliminated from the brewing chamber 1 and collected into the filter for removal.

Owing to them being largely known in the art, the description of other steps included in the operation of the brewing device, such as for instance the separation of the filter 10 from the brewing chamber 1 so as to enable the solid residues of the brew to be removed and the initial conditions for starting a new brewing cycle to be restored, is intentionally omitted. The whole operating cycle of the brewing device is controlled and managed by an appropriate automatic programme sequence control unit of a type known as such in the art.

It can be readily appreciated that the brewing device according to the present invention turns out as being particularly simple, reliable and efficient, thanks to the use of the automatic valve 6 that regulates all flows through the mixing hopper 2 and the brewing chamber 1 up to the filter 10, from which the beverage is dispensed and the solid residue is removed. The number of the functional parts of the device is therefore reduced to a minimum and the related movements and displacements are extremely simplified.

The invention claimed is:

1. A beverage brewing device for brewing hot beverages such as coffee, tea, roasted-barley coffee, camomile tea and similar infusions, the brewing device comprising:
    a brewing chamber having an upper opening and a lower open end;
    a removable filter closing the lower open end;
    a mixing hopper arranged above said brewing chamber to feed substances needed to prepare an infusion to said brewing chamber through the opening;
    air compression means for supplying said brewing chamber with compressed air, said air compression means including a fixed delivery conduit extending inside said brewing chamber and debouching below the opening; and
    a valve member arranged inside said brewing chamber between the delivery conduit and the opening and movable upwards, under the action of compressed air supplied by the delivery conduit, along said brewing chamber and toward a closed position in which said valve member closes the opening in a fluid tight manner.

2. A device as claimed in claim 1, wherein said valve member is movable along said brewing chamber between the closed position and a lower open position, in which said valve member rests on the delivery conduit and is supported thereby.

3. A device as claimed in claim 1, wherein said valve member has an umbrella-shaped surface facing the opening so as to be able to diffuse a liquid entering said brewing chamber through the opening against a lateral surface of said brewing chamber, thereby enabling the lateral surface to be flushed clean.

4. A device as claimed in claim 3, further comprising a sealing means provided on said valve member at the umbrella-shaped surface to ensure fluid tight closure of the opening when said valve member is in the closed position.

5. A device as claimed in claim 1, wherein said brewing chamber extends along a vertical axis, the opening and said valve member are co-axial with the vertical axis, and said valve member is movable along the vertical axis.

6. A device as claimed in claim 1, further comprising a venting conduit arranged above the opening and communicating with the opening in parallel with said mixing hopper.

7. A device as claimed in claim 1, wherein said air compression means is a reversible compression means.

* * * * *